Figure 1:
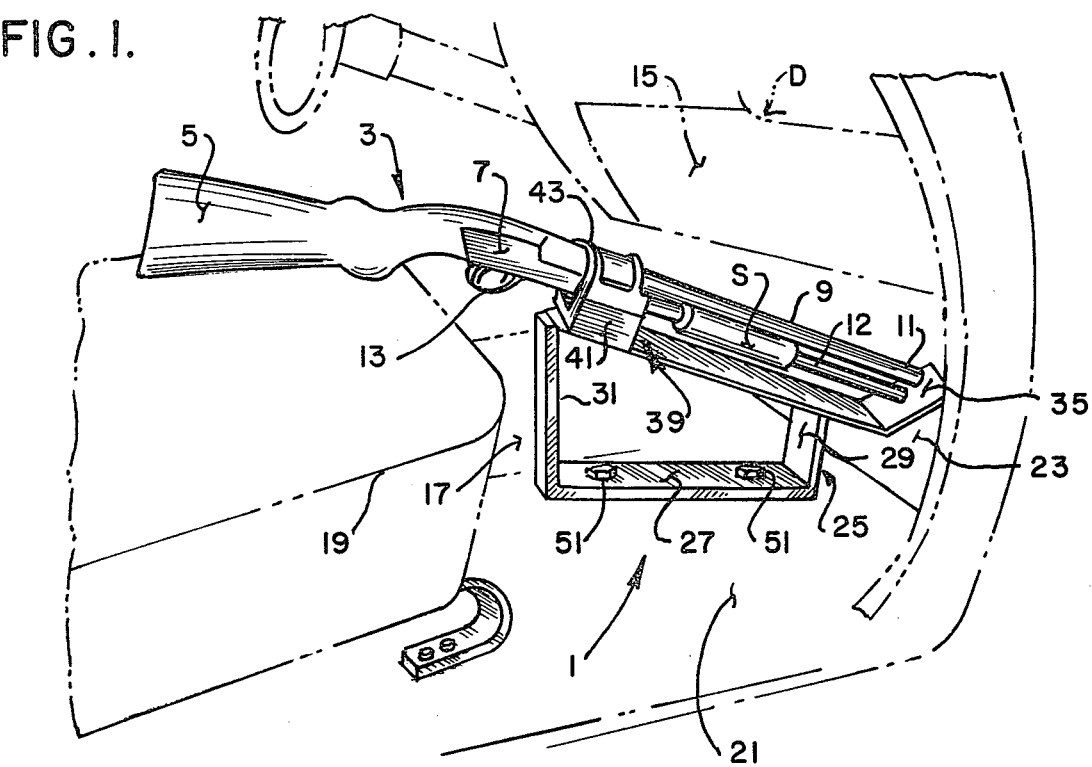

United States Patent [19]

Knight et al.

[11] 4,364,449
[45] Dec. 21, 1982

[54] INDUSTRIAL TRUCK

[75] Inventors: William Knight, Coventry; David G. Marriott, Nuneaton, both of England

[73] Assignee: Coventry Climax Limited, England

[21] Appl. No.: 158,601

[22] Filed: Jun. 11, 1980

[30] Foreign Application Priority Data

Jun. 29, 1979 [GB] United Kingdom ............... 7922780

[51] Int. Cl.³ ............................................. B60K 31/00
[52] U.S. Cl. ..................................... 180/271; 180/142
[58] Field of Search ....................... 180/271, 282, 6.28, 180/141, 142, 143, 79; 280/755

[56] References Cited

U.S. PATENT DOCUMENTS

| | | | |
|---|---|---|---|
| 1,164,109 | 12/1915 | Manly | 180/79 |
| 1,902,626 | 3/1933 | Eggen | 180/271 |
| 2,139,569 | 12/1938 | Alvarado | 180/271 |
| 2,571,180 | 10/1951 | Ball et al. | 180/6.28 |
| 3,332,507 | 7/1967 | Bush | 180/6.28 |

FOREIGN PATENT DOCUMENTS

2512197 10/1976 Fed. Rep. of Germany ..... 180/6.28

Primary Examiner—John A. Pekar
Attorney, Agent, or Firm—Thomas J. Greer, Jr.

[57] ABSTRACT

An industrial truck, which may be a fork-lift truck, has steering wheels 1,2 at the rear which can attain high steering locks. In order to counteract the possibility of overturning the truck by accidental heavy depression of the accelerator pedal at such high steering locks, switches 16,17 are provided on the truck which are actuated by trip plates 24,25 when steering angles in excess of, for example, 78° (measured as the angle turned through from the straight ahead position by the inner steering wheel) are reached. The switches reduce the engine power by setting a maximum rate of pulsing of the electric traction motor of the truck. In another embodiment, one switch is attached to a king-pin, and the bearing which rotates about that king-pin carries two lugs, one of which is actuated on each steering lock of 78°.

9 Claims, 5 Drawing Figures

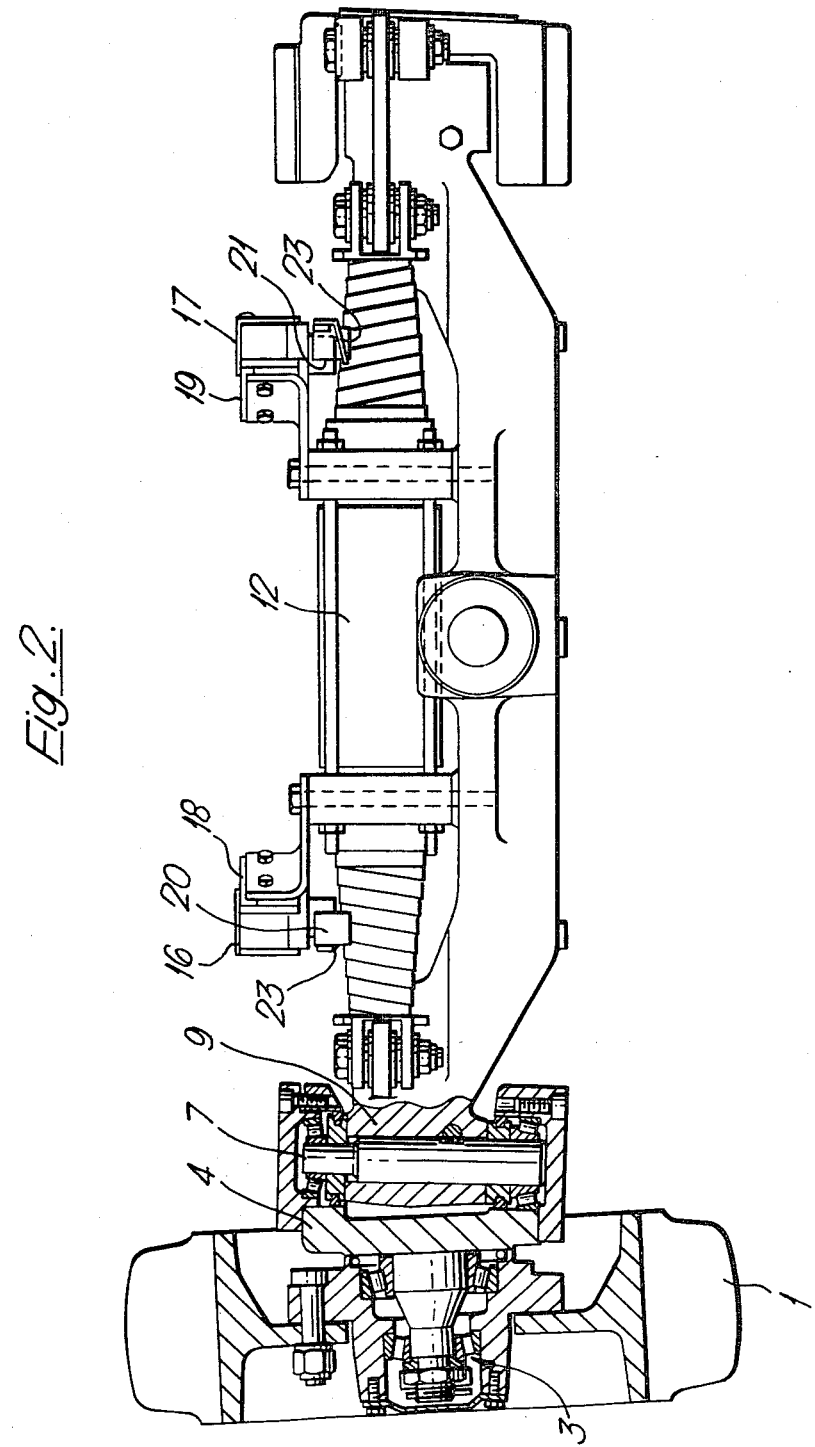

INDUSTRIAL TRUCK

The invention relates to industrial trucks.

The invention provides an industrial truck which includes one or more switches arranged to be actuated when the angle turned through from the straight ahead position by the inner one of the steering wheels reaches a value which is greater than 70°, and wherein the arrangement is such that the maximum speed attainable by the driving wheels is reduced when the switches are actuated.

The reduction of output engine power at high steering angles tends to reduce the risk of the operator inadvertently toppling the truck over: this is especially prone to occur where the drag is high, which is often the case since many industrial trucks are steered at the back and driven at the front.

Advantageously, the switch or switches are actuated on relative movement between a trip member and the or each switch: one part may be secured to a part of the steering linkage, for example, the piston of a power steering unit, and the other may be fixed, for example, it may be secured to the cylinder of the power steering unit; alternatively, one part may be fixed relative to the king-pin of a steering wheel and the other part may be fixed relative to the part that rotates about the king-pin.

Advantageously, there is provided a pair of switches arranged so that one is actuated on each steering lock.

Advantageously, the truck has an electric traction motor. Preferably, current to the electric motor is supplied in pulses, the ratio of pulse duration to pulse separation being variable by means of the accelerator to vary the speed of the driving wheels, and wherein actuation of the switches reduces the maximum ratio attainable of pulse duration to pulse separation.

Advantageously, the value at which the switch or switches are actuated is greater than 75°.

Figure 2:
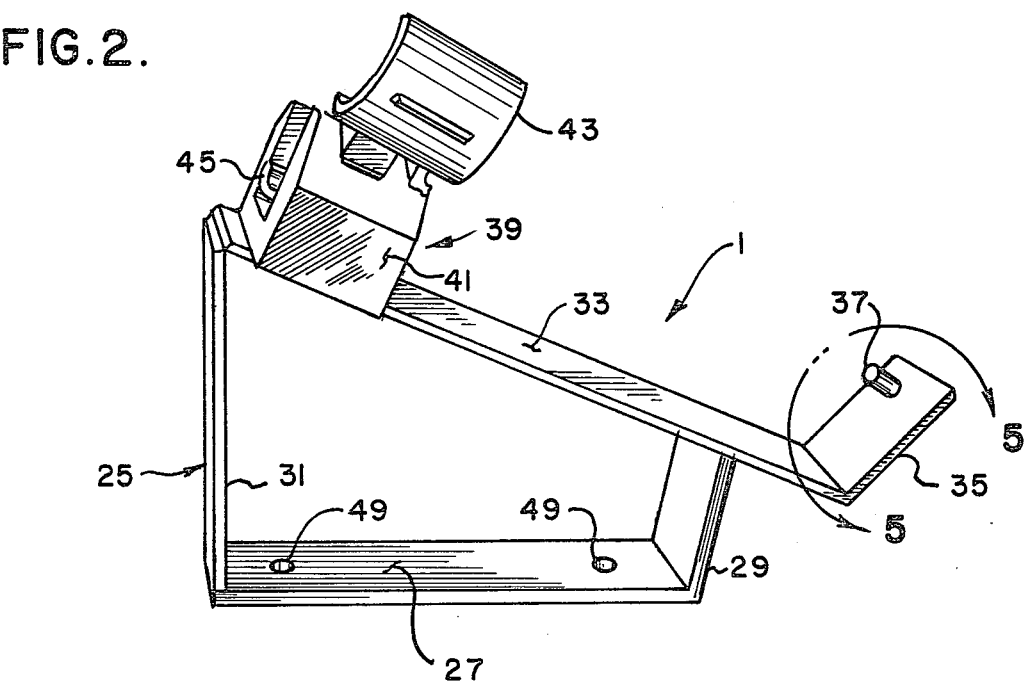
Figure 3:
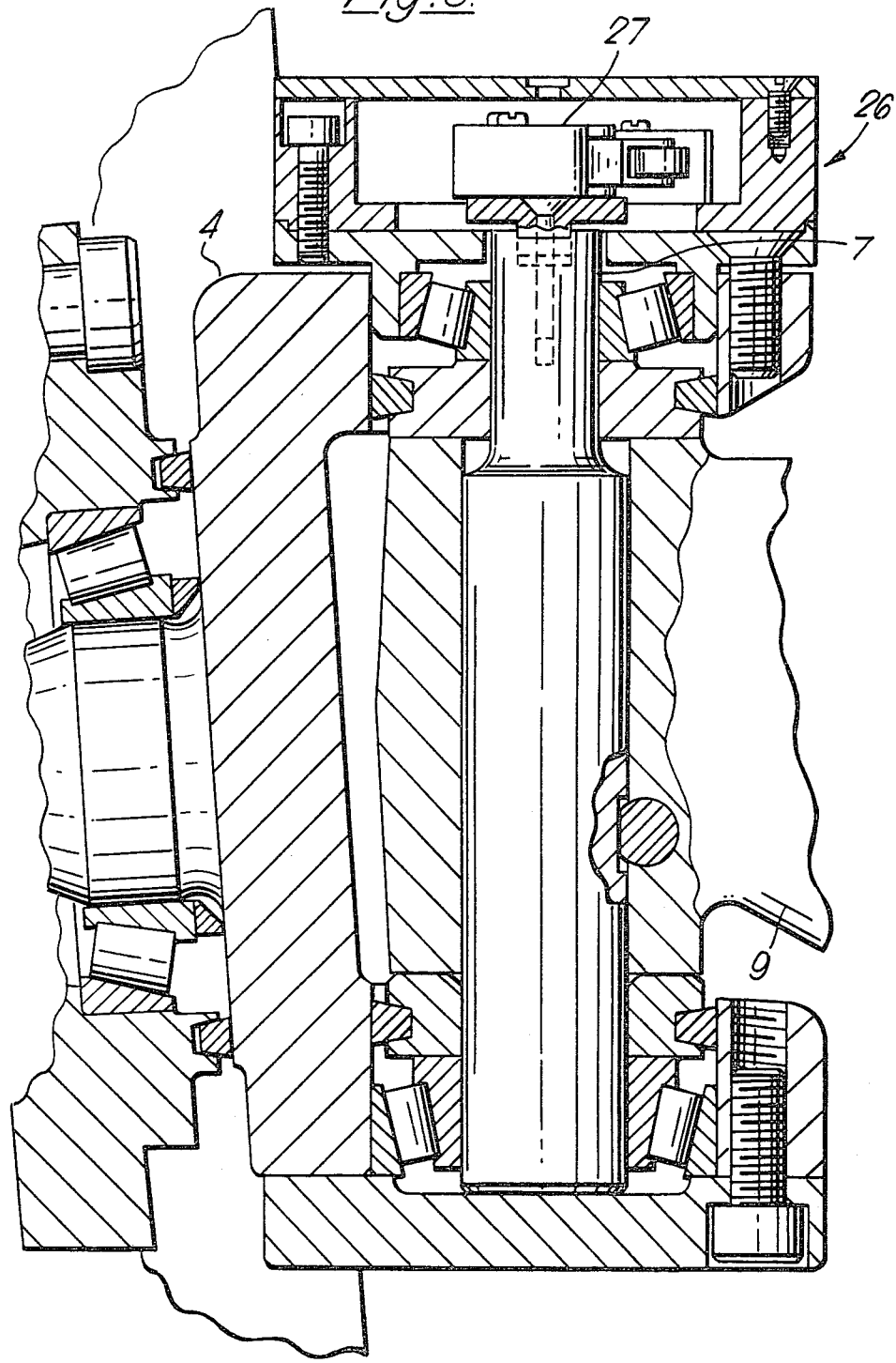
Figure 4:
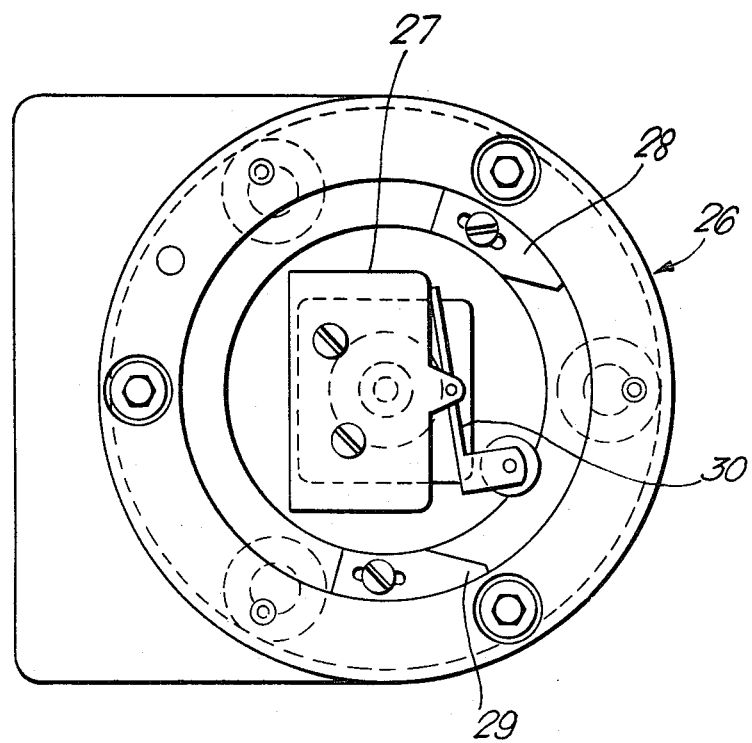
Figure 5:
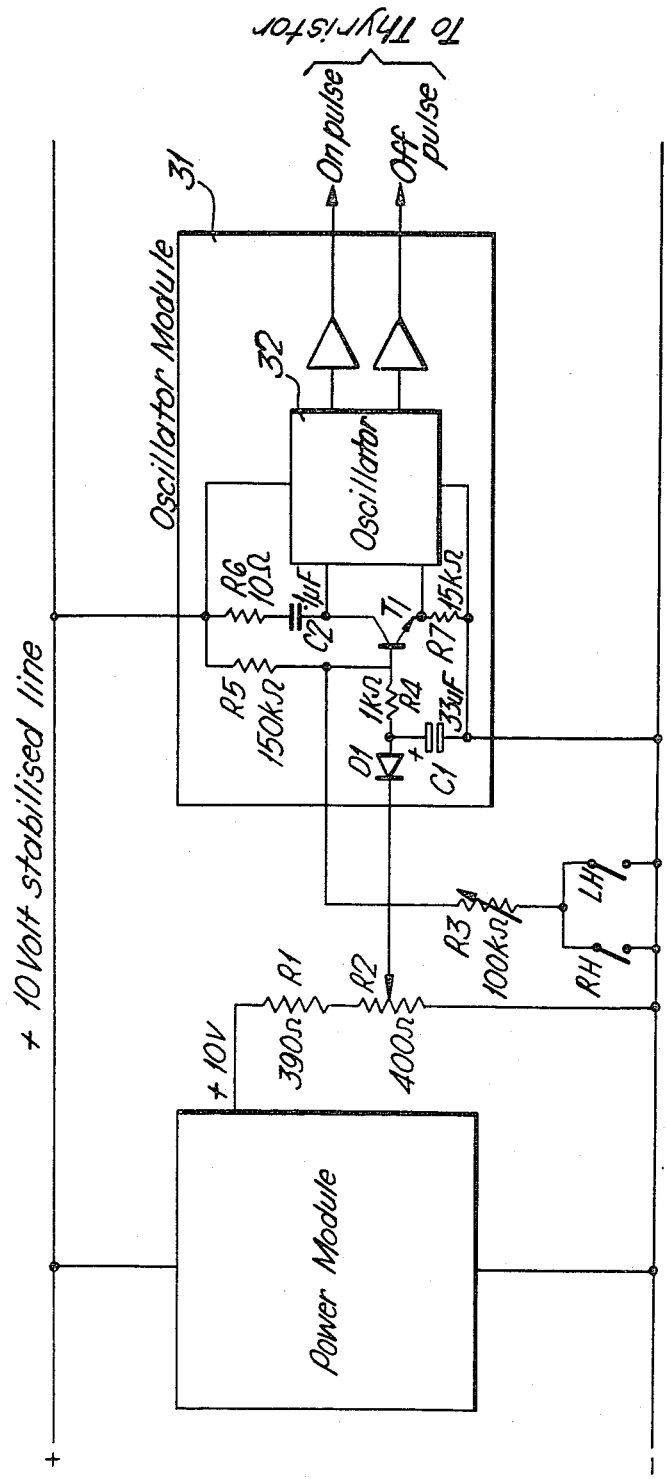

An industrial truck constructed in accordance with the invention will now be described, by way of example, with reference to the accompanying drawings, in which:

FIG. 1 is a plan view of the rear, steering, axle of a first form of industrial truck, FIG. 2 is a front view, partly in section, of the steering axle, FIG. 3 is a front view, partly in section, of a part of the steering axle of a second form of industrial truck, FIG. 4 is a plan view of the part of the steering axle shown in FIG. 3 with the trip plate removed, and FIG. 5 is a circuit diagram of a control circuit for an electric motor suitable for use in the trucks of FIG. 1 or FIG. 3.

Referring to FIG. 1, in the first form of truck, the rear of the vehicle is at the bottom of the drawing, that is, the front driving wheels and the lifting mechanism such as forks adjacent thereto (not shown) are located above the top of the drawing. The vehicle is powered by electric batteries (not shown).

The rear axle assembly shown in FIGS. 1 and 2 comprises a pair of steering wheels 1,2, which are rotatably mounted by means of bearings (only one of which, 3, is shown) on stub axles (only one of which, 4, is shown). The stub axles are pivotably mounted on king-pins (only one of which, 7, is shown) by means of bearings. The king-pins are fixed relative to the axle 9.

The steering linkage includes a pair of links 10,11 which are connected at one end to the stub axles and at the other to pistons of a power steering cylinder 12. The power steering cylinder is bolted to the axle by means of bolts 13. The pistons are protected by telescoping covers 14,15.

The wheels are shown in outline in FIG. 1 at extreme lock: the outer wheel has turned through 60° from its straight ahead position and the inner wheel has turned through 87° from its straight ahead position.

Since the vehicle is driven at the front and steered at the back, there is a substantial amount of drag and, at the extreme locks, it would be possible for the operator to accidentally topple the vehicle over if he subject it to sudden acceleration.

In accordance with the invention, the truck is provided with a microswitch for sensing when the lock is becoming high and with means for reducing the power supplied by the electric motor, for a given accelerator pedal depression, when the microswitch operates, in order to reduce the maximum speed attainable by the driving wheels.

Referring to FIG. 1, each microswitch 16,17 is mounted on the upright part of an angled bracket 18,19 which are bolted to the cylinder assembly. Each microswitch carries a side guard plate 20,21 (FIG. 2) and a bottom leaf spring 22,23 mounted on the outer part of each microswitch and extending inwardly under the part of the microswitch to be actuated. Trip plates 24,25 are secured to the inner ends of the links 10,11 of the steering linkage and are bevelled on the inner edge.

In operation, when the lock is increased to a high angle on either side, the trip plates 24,25 engage the leaf springs 22,23 and, when the lock on the inner wheel (that is, the wheel nearer to the centre of the turning circle) is equal to 78°, the microswitch 16,17 trips.

The circuit for controlling the electric motor (a suitable form being illustrated in FIG. 5) pulses the electric motor with battery current. The ratio of pulse duration to pulse separation (the so-called mark/space ratio) is variable by depression of the accelerator pedal. When one of the microswitches 16,17 trips, the circuit sets a maximum ratio of pulse duration to pulse separation. If the accelerator pedal is depressed to a position which would normally result in a ratio of pulse duration to pulse separation less than the maximum ratio, the truck operates as normal. If the pedal is depressed to a position which would normally result in a higher duration/separation ratio, only the maximum ratio will be set, and further depression of the accelerator pedal will have no effect. Thus, if for example, the operator of the truck releases the accelerator and redepresses it later, having forgotten of the large steering angle set, the truck will turn gently and any tendency to overturn, which would have occurred had a sudden large acceleration been applied, will be substantially reduced. In addition, tire wear will be reduced.

The second form of truck differs from the first only in the operation of the microswitches. Like parts are given like reference numerals between the two forms of truck.

The bearing on which one of the stub axles rotates on its king-pin has a cylindrical box 26 secured to the top of the bearing. The box contains a microswitch 27 which is rigidly secured to the top of the king-pin 7. The box, which rotates with the bearing about the king-pin, also contains a pair of actuating lugs 28,29.

As the wheel corresponding to that king-pin rotates, the lugs 28,29 strike the arm 30 of the microswitch 27. When that wheel is on the inside of the turning circle of the truck, one of the lugs actuates the microswitch when that wheel has turned through 78° from its straight ahead position. When that wheel is on the outside of the turning circle, the other lug actuates the microswitch when the other wheel (now the inner wheel) has turned through 78° from its straight ahead position.

With this arrangement, one microswitch has been dispensed with compared to the first form of truck, and also the microswitch and actuating lugs we now enclosed.

A suitable electric circuit for controlling the electric motor of each form of truck is shown in FIG. 5. A potentiometer R2 has a tapping which is variable in accordance with the accelerator pedal of the truck. An oscillator module 31 is controlled by the potential set by the potentiometer R2. By means of R4–7, C1,2 and D1, a variable mark/space (i.e. pulse duration/pulse separation) ratio square wave oscillator 32 produces alternate on and off pulses which are fed to a thyristor (not shown) via which the motor of the truck receives current from the vehicle battery.

When the accelerator is just depressed, a minimum pulsing rate of 1 millisecond on to 70 milliseconds off is produced. As the pedal is depressed, the off time is steadily decreased to 2 milliseconds while the on time remains the same. Further depression produces a transition region where the on time increases while the off time decreases. Thereafter, the off time remains at 1 millisecond while the on time gradually increases to 70 milliseconds.

The microswitches RH and LH have the effect of applying a voltage clamp to the input of the transistor T1 which prevents the mark/space ratio from rising above 1 millisecond on to 3.4 milliseconds off. This restricts the maximum speed attainable by the driving wheels. Preset resistor R3 can be adjusted to bring the voltage clamp into operation at a different voltage level and hence a different mark/space ratio.

It has been found that a convenient way of setting R3 is to close the switch RH or LH, stall the vehicle motor, and then adjust R3 until the battery current is equal to 85 amps. This produces the mark/space ratio referred to. For this adjustment, the accelerator pedal must be fully depressed, that is, the tapping must be at the end adjacent R1. This current can be compared with that produced with the motor stalled and accelerator depressed when the switches RH and LH are open. The battery current in that case is around 160 amps.

We claim:

1. An industrial truck which includes steering wheels and driving wheels, an electric traction motor operative to drive both said driving wheels, at least one traction motor control switch, said at least one switch reducing the electrical energy fed to the traction motor when the switch is actuated, the switch being actuable when the angle turned through, from the straight ahead position by the inner one of said steering wheels reaches a value which is a predetermined angle, whereby the maximum speed attainable by said driving wheels is reduced when said at least one switch is actuated, wherein current to the electric traction motor is supplied in pulses, the ratio of pulse duration to pulse separation being variable by means of an accelerator to vary the speed of the driving wheels, and wherein actuation of said at least one switch reduces the maximum ratio attainable of pulse duration to pulse separation.

2. An industrial truck as claimed in claim 1, wherein the said at least one switch is actuated on relative movement between a trip member and said at least one switch.

3. An industrial truck as claimed in claim 2, wherein one of the trip member or switch is secured to a part of the steering linkage and the other of the switch or trip member is fixed.

4. An industrial truck as claimed in claim 3, wherein the said part of the steering linkage is the piston of a power steering unit.

5. An industrial truck as claimed in claim 2, wherein one of the trip member or switch is fixed relative to the king-pin of one of the said steering wheels and the other of the switch or trip member is fixed relative to the part of the king-pin that rotates about the king-pin.

6. An industrial truck as claimed in any one of claims 1 to 5, wherein there is provided a pair of switches arranged so that one of the pair is actuated on each steering lock.

7. An industrial truck as claimed in any one of claims 1 to 5, wherein the value of the said predetermined angle is 70°.

8. An industrial truck as claimed in claim 1, wherein the value of the said predetermined angle is 70°.

9. An industrial truck which includes steering wheels and driving wheels, an electric traction motor operative to drive both said driving wheels, at least one traction motor control switch, said at least one switch reducing the electrical energy fed to the traction motor when the switch is actuated, the switch being actuable when the angle turned through, from the straight ahead position by the inner one of said steering wheels reaches a value which is greater than a predetermined angle, whereby the maximum speed attainable by said driving wheels is reduced when said at least one switch is actuated, and wherein the said at least one switch is actuated on relative movement between a trip member and said at least one switch, and wherein one of the trip member or switch is secured to a part of the steering linkage and the other of the switch or trip member is fixed, and wherein the said part of the steering linkage is the piston of a power steering unit.

* * * * *